United States Patent [19]

Segerljung

[11] Patent Number: 4,995,679
[45] Date of Patent: Feb. 26, 1991

[54] WHEEL ASSEMBLY FOR MOVING OBJECTS

[76] Inventor: Max Segerljung, Pl 7180, S-911 00 Vannas, Sweden

[21] Appl. No.: 353,633
[22] PCT Filed: Nov. 5, 1987
[86] PCT No.: PCT/SE87/00520
 § 371 Date: Jun. 9, 1989
 § 102(e) Date: Jun. 9, 1989
[87] PCT Pub. No.: WO88/03492
 PCT Pub. Date: May 19, 1988

[30] Foreign Application Priority Data

Nov. 7, 1986 [SE] Sweden ................................ 8604781

[51] Int. Cl.$^5$ ............................................. B60B 33/00
[52] U.S. Cl. ..................................... 301/5 R; 16/18 A; 180/7.1; 301/1
[58] Field of Search ................ 301/1, 5 R, 124 R; 16/18 R, 18 A; 180/7.1, 233, 238, 252, 253

[56] References Cited

U.S. PATENT DOCUMENTS

| | | | |
|---|---|---|---|
| 2,812,031 | 11/1957 | Aghnides | 301/5 R X |
| 2,998,996 | 9/1961 | Aghnides | 301/5 R X |
| 3,424,259 | 1/1969 | Aghnides | 180/7.1 X |
| 4,519,466 | 5/1985 | Shiraishi | 180/7.1 |
| 4,785,899 | 11/1988 | von Winckelmann | 180/252 X |

FOREIGN PATENT DOCUMENTS

| | | | |
|---|---|---|---|
| 977689 | 11/1975 | Canada | 180/7.1 |
| 1427653 | 1/1966 | France | 16/18 A |
| 2541960 | 9/1984 | France | |
| 60-78831 | 5/1985 | Japan | |
| 8302431 | 7/1983 | World Int. Prop. O. | |

Primary Examiner—Russell D. Stormer
Attorney, Agent, or Firm—Sandler, Greenblum & Bernstein

[57] ABSTRACT

A wheel assembly for moving an object, such as load carrying vehicles, and similar types of machines. The assembly enables unique motion possibilities, such as changing the direction of the object's motion perpendicularly to a preceding direction of motion. The assembly includes a wheel, which can be either driven or freely rotatable, for propelling the vehicle. The rolling point of the wheel rests upon a support surface, which is positioned at a radial distance from a drive shaft. To change the direction of motion, the wheel is rotated around the drive shaft, along a circle having the aforementioned radius.

8 Claims, 2 Drawing Sheets

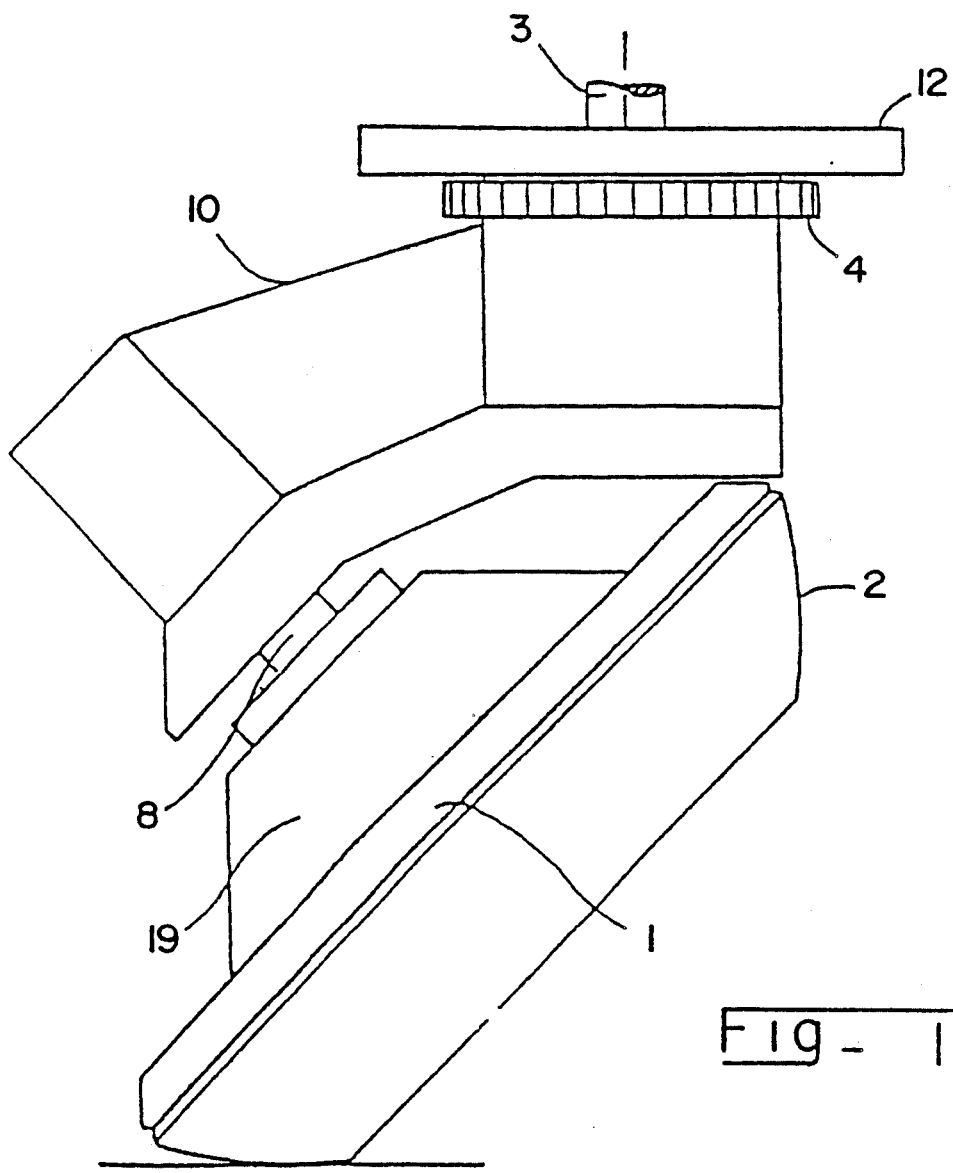
Fig_1

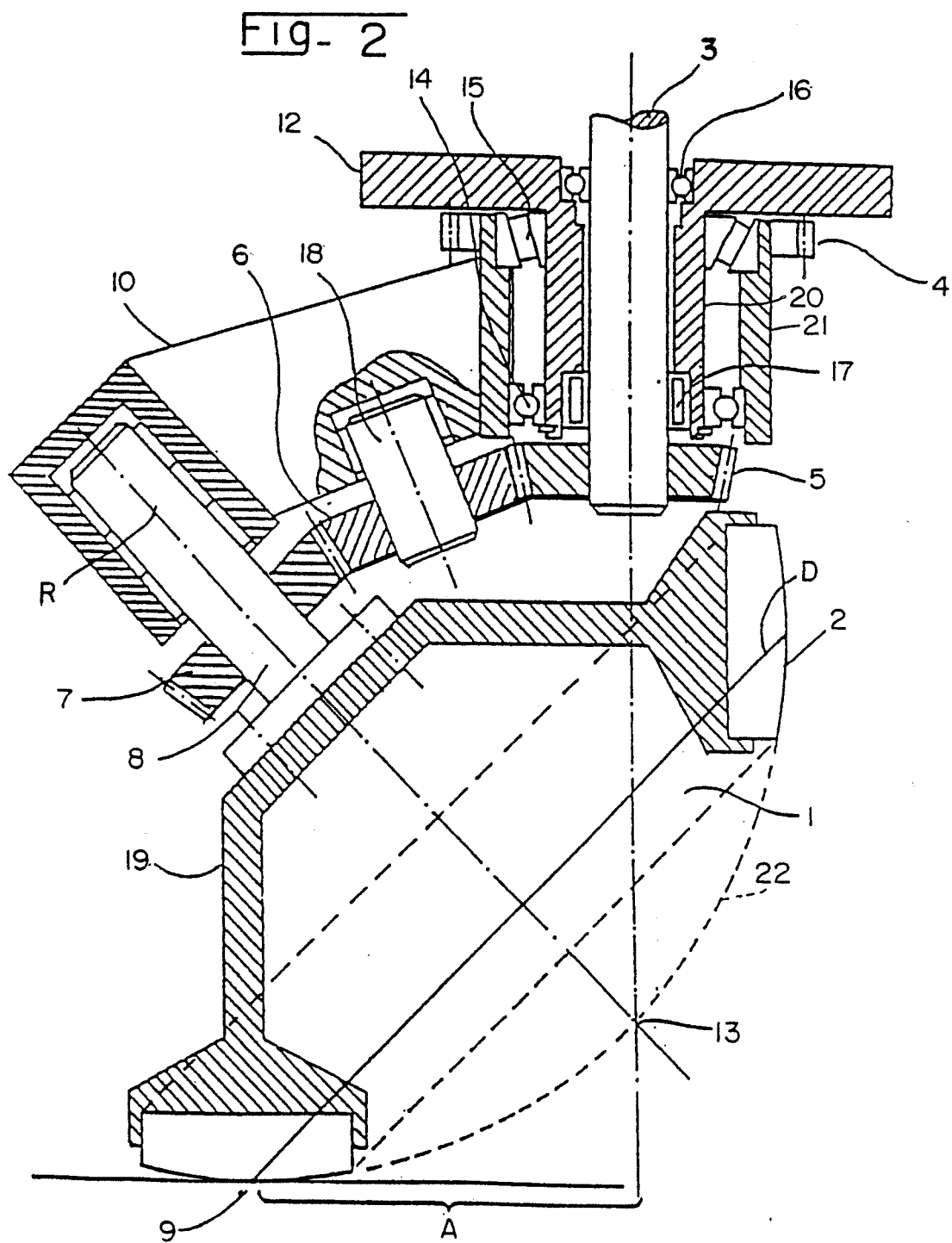

WHEEL ASSEMBLY FOR MOVING OBJECTS

BACKGROUND OF THE INVENTION

This invention relates to means for moving an object on a surface. More specifically, the invention is directed to a wheel assembly for use, for example, with a vehicle, a load carrier, or other type of similar apparatus used for moving objects. The wheel assembly comprises at least one wheel arranged on the object.

SUMMARY OF THE INVENTION

An object of the present invention, among others, is to provide a means for propulsion and control of a vehicle, for example, which enables unique motion possibilities. The means for moving is constituted so that it is possible to change the direction of movement of the vehicle perpendicularly, for example, to a previous direction of motion.

Thus, equipped with the means according to the present invention, vehicles can be driven around sharp corners and in spaces requiring a small turning radius. Regarding industrial load carrying vehicles, for example, for material transportation, an essential advantage is achieved in that transportation apparatus can be optimized, i.e., the number of such vehicles can be minimized which, accordingly, results in better utilization of valuable areas.

The means for moving according to the present invention is easy to control through simple mechanical arrangements, having control and propulsion qualities comparable with those achieved by very advanced electronically controlled systems.

Besides the unlimited motion patterns made possible by the present invention, other advantages are achieved, such as no increase in wear on the wheel or on the surface during twisting or turning. Similarly, there is no increase in wear on the wheel during the turning, or steering, of the wheel on a stationary vehicle. The wheel according to the present invention does not require the return to a neutral position for continuous turning of the wheel. Also in this regard, the present invention essentially differs from known apparatus, such as hydraulically driven wheels for trucks in which the wheel must be returned to a neutral position before turning in order that conduits and similar structures are not damaged. Another essential advantage achieved by the moving assembly according to the present invention is that it is possible to put the assembly in a desired position, irrespective of the previous position, and in the quickest possible manner.

BRIEF DESCRIPTION OF THE DRAWINGS

The present invention will now be described in greater detail with reference to the accompanying drawings, in which:

FIG. 1 is an elevation view of the wheel assembly of the present invention; and

FIG. 2 is a transverse cross-sectional view of the wheel assembly of the present invention.

DETAILED DESCRIPTION OF PREFERRED EMBODIMENT

The present invention comprises, as a main element, a wheel 1, which is preferably obliquely arranged, as shown in FIGS. 1 and 2, and which at its periphery has a partial spherical tread surface 2, the wheel adapted to be arranged on an object such as a vehicle, a load carrier, truck, and other types of machines. For propelling the vehicle by means of the wheel 1, as will be further described below, a first drive shaft 3 is provided. In addition, a gear wheel, or drive gear 4, is mounted concentrically with shaft 3, which is provided for a control, or steering, function. Gear 4 is operatively connected to a shifting motor, or other suitable driving means, which is not shown in the drawing. Further, a motor is to be provided for rotating shaft 3, preferably by means of a further driving gear, also not illustrated in the drawing.

The rotation of the first drive shaft 3 is transmitted, as shown in FIG. 2, via a transmission arrangement formed by gear wheels 5, 6, and 7, to a second drive shaft 8 of wheel 1. Wheel 1 is obliquely arranged in relation to first drive shaft 3, but can, in other embodiments, be perpendicularly arranged in relation to drive shaft 3.

The first drive shaft 3 is journalled in a plate 12 and held in sleeve 20 by bearings 16 and 17. Plate 12 can be fastened on the object, or it can comprise a part of the object. Shaft 8 is journalled for rotation with respect to a support arm 10, in which shaft 18 for the intermediate drive gear 6 is also journalled. Shaft 8 is connected to wheel 1 which, besides the partial spherical tread surface 2, comprises a rim 19 to which the second drive shaft 8 can be fastened.

The rotational motion of first drive shaft 3 is accordingly transmitted to wheel 1 which, having the subspherical peripheral tread surface 2 in contact with the surface at the rolling point 9, drives the vehicle. Second drive shaft 8 is fixed against a pivoting motion in relation to first drive shaft 3 and is only permitted to rotate around its own rotational axis R, with propulsion made in the same direction. The second drive shaft 8 is fixed against rotation about axis 3 by the fact that the support arm 10, in which second drive shaft 8 and shaft 18 of the intermediate drive gear 6 are journalled, is in mechanical connection with the gear wheel or the drive gear 4, which is rigidly connected to a sleeve 21 of the support arm 10. As such, support arm 10 can not rotate if the drive gear 4 is not influenced to rotate by an external driving means.

The support arm 10 with second drive shaft 8 and intermediate drive shaft 18 journalled therein is, by means of bearings 14 and 15, pivotably journalled at the sleeve 20 of the plate 12.

When the drive gear 4 is driven, the support arm 10, with shaft 8, pivots around shaft 3 and the wheel 1, at rolling point 9, moves in a circular motion around shaft 3. The rotation axis R of the wheel 1 intersects the prolonged center line of driving shaft 3 at point 13 on an imaginary sphere 22 which is defined by one revolution of the subspherical periphery area of the wheel 1. Furthermore, the point of intersection between the rotation axis R of the wheel and line D, the diameter of the wheel 1 in the rolling plane shown in FIG. 2, is a radial distance from shaft 3.

In the embodiment as shown in the drawings with, for example, a gear ratio of 1:1 between shaft 3 and wheel shaft 8, the wheel 1 at the rolling plane will have the same circumference as the circle formed on the surface by the rolling point 9, when support arm 10 completes one revolution around shaft 3. That is, distance A is equal to one-half the distance D, or 0.5D (see FIG. 2). Of course, the present invention is not limited to such a gear ratio between shafts 3 and 8, but any other gear ratio between the two shafts is possible within the scope of the present invention. However, the circumferential velocity of the wheel 1 around axis R is adapted to the circumferential velocity around the circle defined by the rotation of point 9 on the periphery of the wheel 1 around the shaft 3, such that the circumferential velocities correspond to each other. This ensures that there will be no sliding of the wheel in relation to the surface, but, instead, enables a smooth motion, free from losses of traction in all directions along the plane on which the object, provided with the means according to the present invention, rests.

In order to minimize the uneven load, as shown in the illustrated embodiment, the angle between shaft 3 and shaft 8 is approximately 45°, but as previously mentioned, other angles can be selected within the scope of the invention.

A pivoting motion of the support arm 10 around shaft 3 results in an immediate change in the direction of the motion of the object, assuming that there is propulsion at the same time via shaft 3. With respect to stationary objects, i.e., in which shaft 3 is stationary, the support arm 10 can be pivoted around shaft 3 without a driving influence to pivot the support arm 10 and without any movement of the object. Because intermediate gear wheel 6 is journalled in the support arm 10 between gear wheels 5 and 7, pivoting of the support arm 10 for guidance, i.e., for steering of the vehicle, will not contribute to a propelling motion of the object, even if a driving force is applied at the same time via drive shaft 3.

The gear wheels 5, 6, and 7 are conical and designed with the same pitch.

The present invention is not limited to what has been described above and shown in the figures but can be envisioned in many different ways within the scope of the invention. Thus, it is possible to provide wheel 1 with a motor of its own for propulsion and for rotation around the rotation axis. In such a case, there is no need to provide driving shaft 3.

I claim:

1. An assembly for moving an object with respect to a surface, said assembly comprising:
   a first drive shaft having an axis about which said first drive shaft is adapted to rotate;
   a wheel adapted to be assembled to said object and having a periphery defining a rolling plane including a rolling point resting against the surface and being spaced a radial distance from said first drive shaft;
   means for mounting said first shaft for rotation about said axis, said mounting means comprising a plate having a sleeve and bearings supporting said first drive shaft for rotation about said axis with respect to said sleeve;
   a second drive shaft rigidly connected to said wheel, said second drive shaft having an axis of rotation positioned such that said first drive shaft and said second drive shaft extend from a point o intersection of said axis of said first drive shaft and said axis of said second drive shaft at an angle greater than 0° but no greater than 90°; and
   a transmission comprising a first gear wheel fixed for rotational movement with said first drive shaft, a second gear wheel fixed for rotational movement with said second drive shaft, and an intermediary gear wheel for transmitting rotational movement between said first drive shaft and said second drive shaft.

2. The assembly of claim 1, further comprising a support arm, said intermediate gear wheel having an axle mounted for rotation within said support arm, and said second drive shaft mounted for rotation within said support arm.

3. The assembly of claim 2, further comprising bearings for mounting said support arm for rotation with respect to said sleeve.

4. The assembly of claim 1, said first gear wheel and said second gear wheel having a gear ratio of 1:1, said rolling plane having a diameter equal to twice said radial distance that said rolling point is spaced from said first drive shaft, so that said diameter of said rolling plane is equal to the diameter of a circle that said wheel defines by said rolling point as said wheel is turned one revolution around said first drive shaft.

5. The assembly of claim 1, said rolling plane of said wheel being obliquely arranged with respect to said first drive shaft.

6. The assembly of claim 1, said assembly being configured and arranged such that a circumferential velocity of said wheel about said axis of said second drive shaft is adapted to be equal to a circumferential velocity of said wheel about said axis of said first drive shaft.

7. The assembly of claim 2, said support arm having a sleeve, said assembly further comprising bearings for mounting said sleeve of said support arm for rotation with respect to said sleeve of said plate, said sleeve of said support arm further comprising a gear adapted to be driven by an external drive means for effecting rotation of said support arm about said axis of said first drive shaft.

8. The assembly of claim 1, said periphery of said wheel having a partial spherical form.

* * * * *

UNITED STATES PATENT AND TRADEMARK OFFICE
CERTIFICATE OF CORRECTION

PATENT NO. : 4,995,679
DATED : February 26, 1991
INVENTOR(S) : Max SEGERLJUNG

It is certified that error appears in the above-indentified patent and that said Letters Patent is hereby corrected as shown below:

At column 4, line 7 (claim 1, line 18), change "o" to ---of---.

Signed and Sealed this

Twenty-fourth Day of June, 1997

Attest:

BRUCE LEHMAN

*Attesting Officer*    *Commissioner of Patents and Trademarks*